April 18, 1944.  T. A. BOWERS  2,346,899
REINFORCING MEANS FOR PISTON RINGS
Filed Aug. 3, 1942   5 Sheets-Sheet 1

Inventor:
Thomas A. Bowers
by  Munn W. Hamilton
Attorney

April 18, 1944.     T. A. BOWERS     2,346,899
REINFORCING MEANS FOR PISTON RINGS
Filed Aug. 3, 1942     5 Sheets-Sheet 2
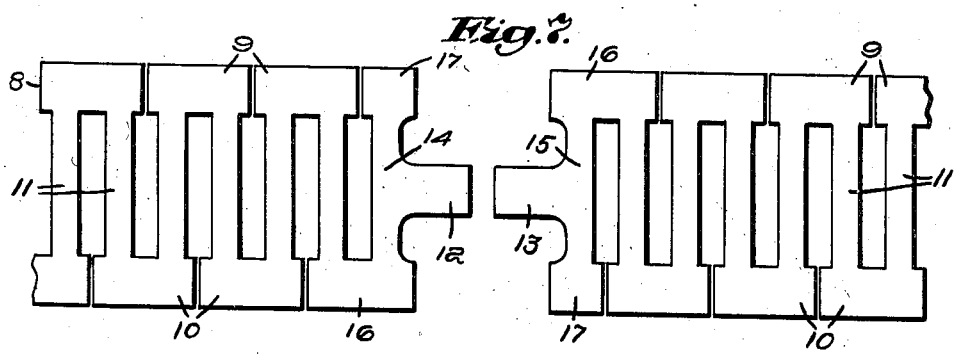
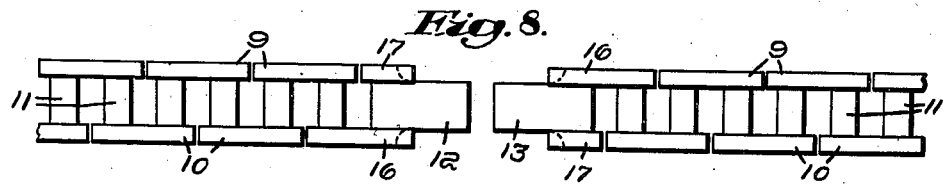
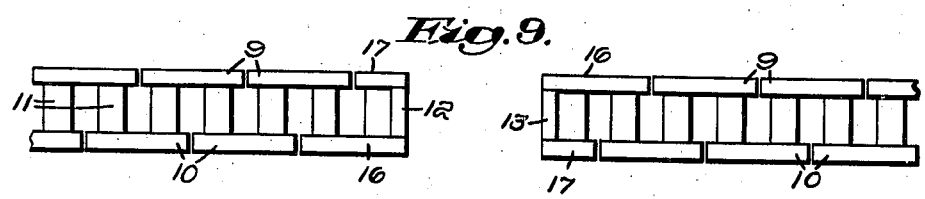
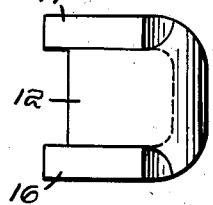
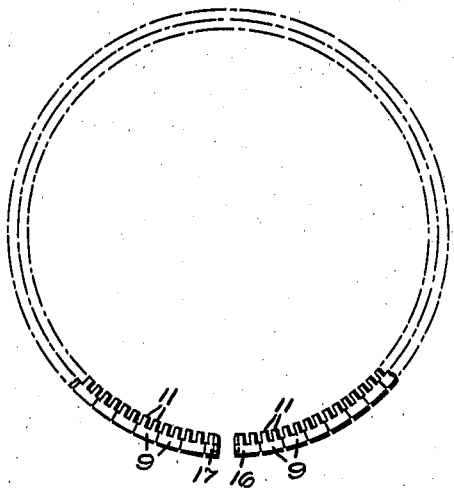
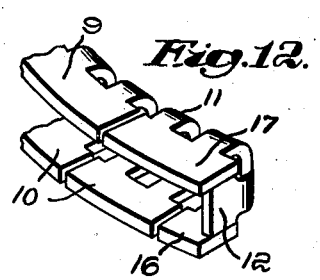

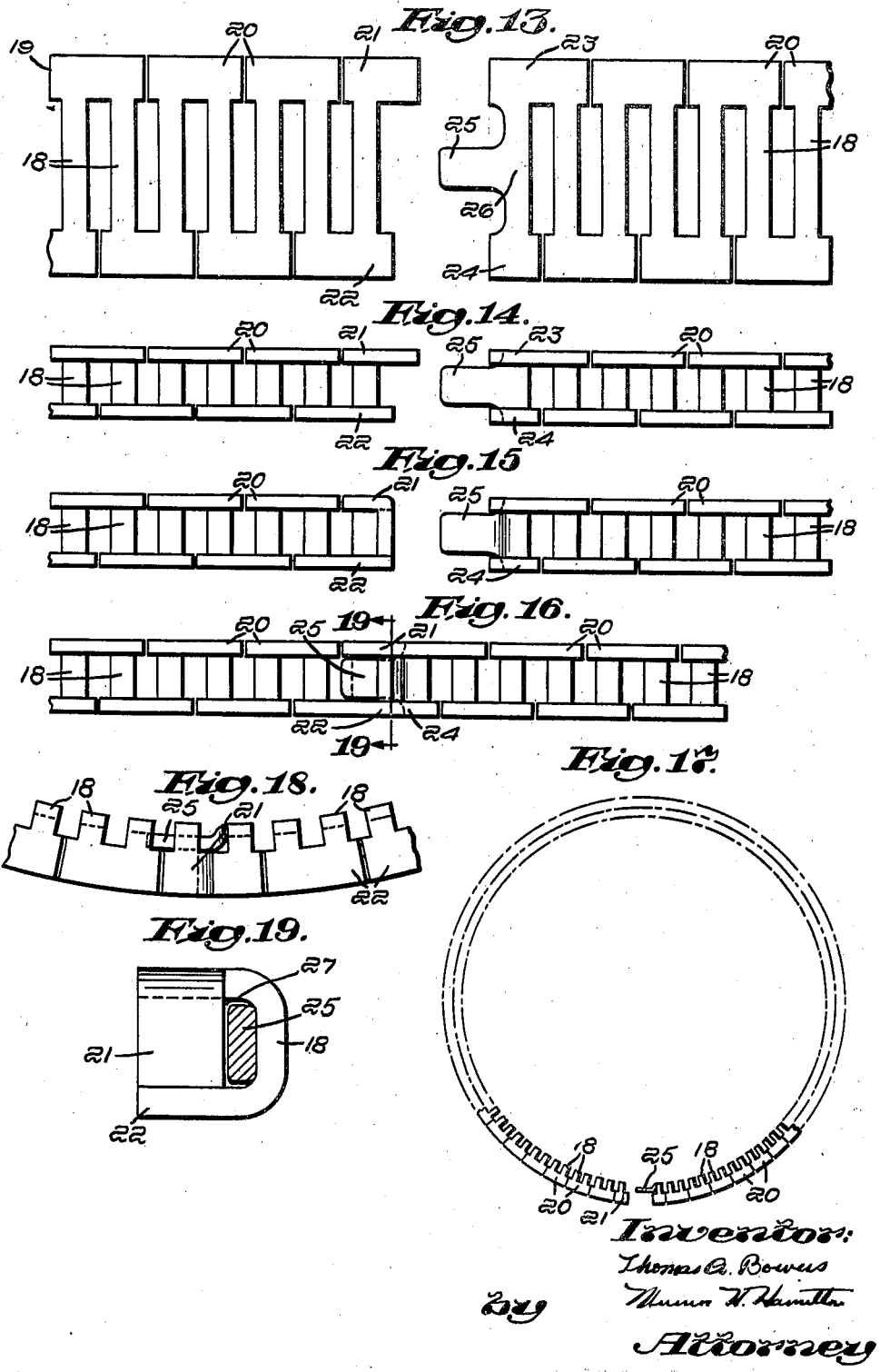

April 18, 1944.  T. A. BOWERS  2,346,899
REINFORCING MEANS FOR PISTON RINGS
Filed Aug. 3, 1942  5 Sheets-Sheet 4
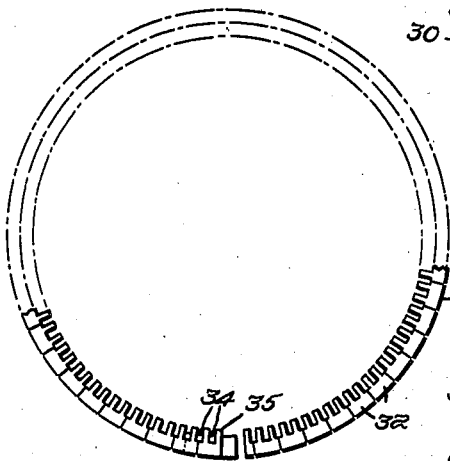
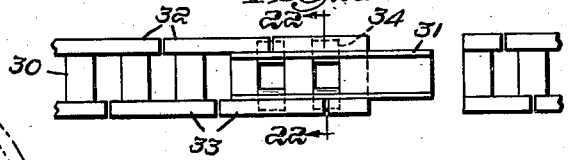
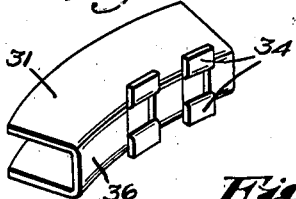
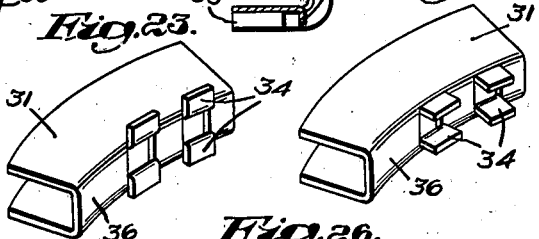
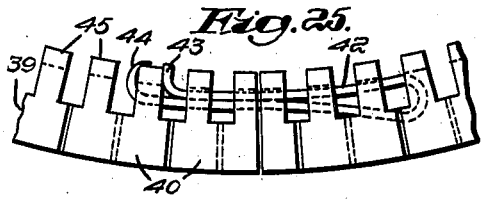
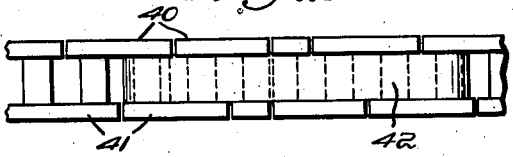
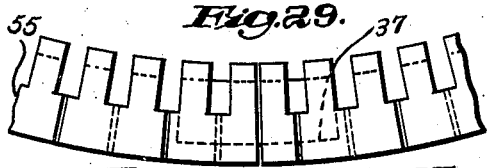
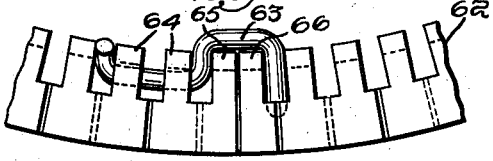
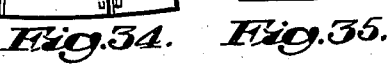
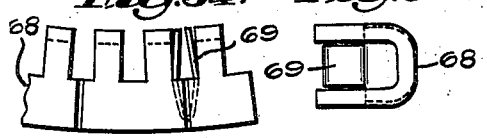

April 18, 1944.   T. A. BOWERS   2,346,899
REINFORCING MEANS FOR PISTON RINGS
Filed Aug. 3, 1942   5 Sheets-Sheet 5
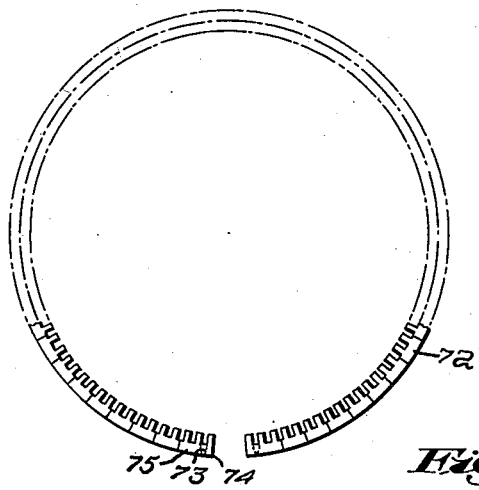
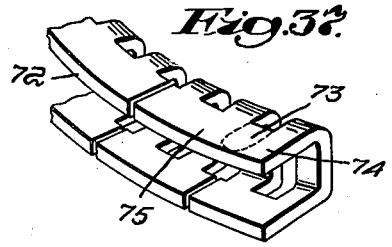
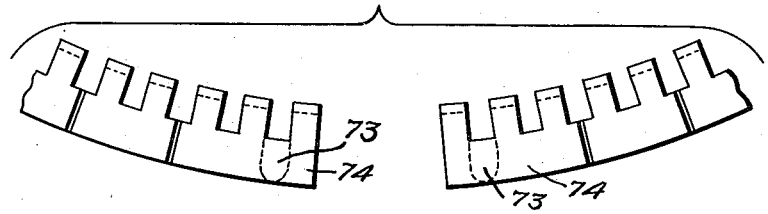
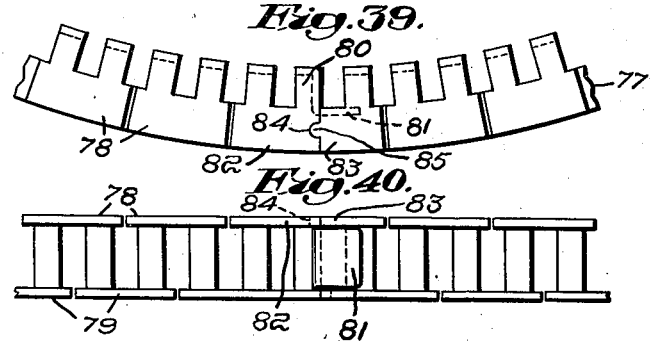
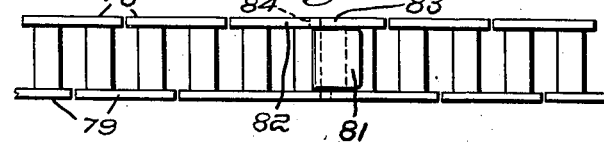
Inventor:
Thomas A. Bowers
Attorney Patented Apr. 18, 1944

2,346,899

UNITED STATES PATENT OFFICE 2,346,899

REINFORCING MEANS FOR PISTON RINGS

Thomas A. Bowers, Mattapoisett, Mass., assignor to Power Research Corporation, Boston, Mass., a corporation of Massachusetts Application August 3, 1942, Serial No. 453,426

6 Claims. (Cl. 309—45)

This invention relates to piston rings and more especially to flexible piston rings of the oil metering type.

In an earlier patent, No. 2,224,338, issued to me December 10, 1940, I have described and claimed a flexible piston ring which is formed from a strip of resilient sheet material folded longitudinally of itself and cut with openings which define segments and connecting web portions. The segments occur in the form of axially spaced-apart annular rows and the outer peripheral edges of the segments function as oil scraping edges for removing excess oil from the wall of a cylinder.

An object of the invention is to improve a piston ring of the resilient sheet metal type described, and to devise improved means for arranging and maintaining the ends of such a piston ring in proper abutting relation when the ring is mounted in a cylinder. Another object of the invention is to incorporate in a flexible piston ring of the type noted means for reinforcing the ends of the ring. Still another object of the invention is to provide improved methods of making sheet metal piston rings.

The nature of the invention and its objects will be more fully understood from the following description of the drawings and discussion relating thereto.

Figs. 7–12 inclusive illustrate another ring and a method of manufacture therefor;

Figs. 13–19 inclusive illustrate another modification of piston ring; and

Figs. 20–40 inclusive illustrate still other modifications of piston rings.

A flexible piston ring of the type referred to in the above noted patent normally operates, in a cylinder and piston, with its ends in abutting relation and with the ring in a partly compacted position. The rings of the present invention operate in a similar manner and include improvements relating to arranging and maintaining the ends of the ring in proper abutting relation.

In a preferred form of ring such as has been illustrated in Figs. 1–6 inclusive, the improvement comprises bent end portions or tabs which act as abutment elements and which also may function as interlocking means. The bent end portions are preferably formed integrally with the strip of which the ring is made and are readily fabricated during the manufacture of the ring.

Figure 1:
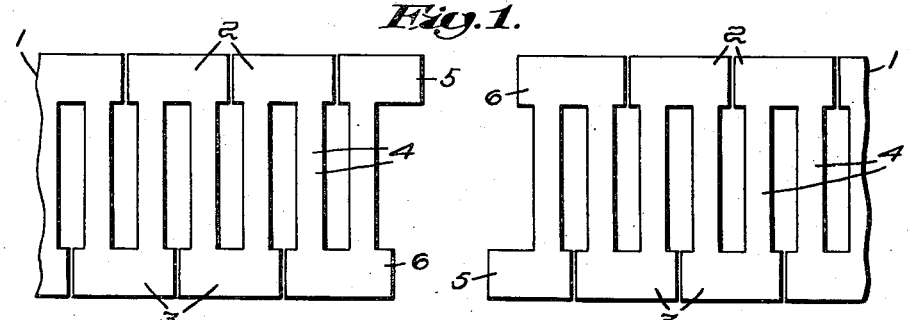
Fig. 1 is a fragmentary plan view illustrating resilient piston ring material formed in accordance with a step in the method of the invention.
Figure 2:
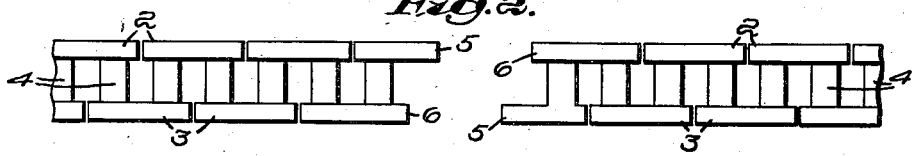
Fig. 2 is a fragmentary elevational view illustrating further treatment of the piston ring material illustrated in Fig. 1.

Referring more in detail to Figs. 1–6 inclusive, numeral 1 denotes a strip of resilient piston ring material. In Figs. 1 and 2, the ends of the strip have been fragmentarily illustrated in spaced-apart relation to show more clearly the manner in which improvements of the invention are incorporated in the ends of a piston ring formed from the strip. The strip 1 has mid portions removed and opposite edges slotted to provide separated segments 2 and 3, connected together by web portions 4, with each of the segments 2 and 3 including at least two web portions.

The segments occurring at the extremities of the strip are formed with relatively large projecting portions 5 and relatively small projecting portions 6, arranged alternately at opposite edges of the strip.

As illustrated in Fig. 2 of the drawings, the strip is bent longitudinally of itself along lines of bending which intersect the web portions to form a U-shaped body, which is thereafter bent into an anular position. The segments 2 and 3 are supported by the webs 4 in circumferentially spaced-apart relation, and occur in annular rows which are separated from one another. The rows of segments also are arranged in parallel relation to one another to provide sealing or seating surfaces which extend at right angles to the axis of the ring. The segments constitute a part of the radial width of the ring and provide a sealing flange or edge which is useful both in removing excess oil from a cylinder wall and in acting as a sealing flange.

Figure 3:
Fig. 3 is a fragmentary elevational view of piston ring material still further treated in accordance with the method of the invention.
Figure 5:
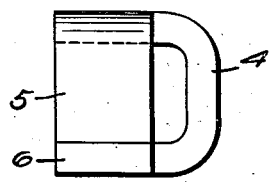
Fig. 5 is an elevational view of one end of the ring of the invention.
Figure 4:
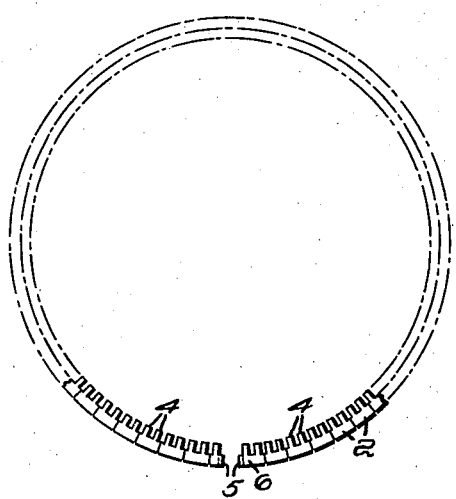
Fig. 4 is a diagrammatic plan view of a completed piston ring of the invention.
Figure 6:
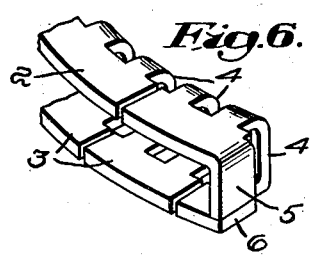
Fig. 6 is a fragmentary perspective view of one end of the ring.

The relatively large projecting portions 5 at the ends of the strip are bent along radial lines of bending to arrange the portions 5 in substantially right angularly disposed position (Fig. 3). In this position the extremities of the projecting portions 5 engage inside of the relatively small projecting portions 6 and present flat faces at the ends of the ring.

The portions 5 are preferably of a length such that they will extend into contact with the projecting portions 6, and the projecting portions 6 are of a length such that their edges are in the same plane as the bent portions 5. As a result the flat faces of the portions 5 and the edges of the portions 6 form substantially continuous abutting surfaces at the ends of the ring, as may be better seen in Figs. 5 and 6.

The flat end faces thus obtained facilitate handling of the ring and mounting it in a piston. The flat faces are adapted to abut smoothly against one another and at all points are free from projections which might become engaged in or on one another during handling of the ring. It is desired to assemble the ring in a cylinder, not only with its ends in abutting relation but with the ring in a slightly compacted position, and the flat end surfaces provide increased areas of bearing by means of which the ring is more easily compacted, less stress occurs at the edges of the segments, and the possibility of distortion of the segments at the ends of the ring avoided.

The bent portions 5 also function to support the remainder of the segments which are integral with the portions 5 at the extremities of the ring, with respect to forces directed axially against the ring. There are thus imparted strength and durability especially at the ends of the ring where it may be exposed to rough handling during assembly in a piston.

The formation of the portions 5 is conveniently carried out during the forming operations resorted to in cutting segments and web portions in a strip of piston ring material. The bending operation is also one which may be quickly and easily carried out by dies or other apparatus during other operations in making the ring. It is intended that all of the steps in the method of making the ring may be of a character such that they may be carried out by tool machinery such as punches, dies and the like, and that the ring may be formed from a strip of piston ring material. However, the construction shown may be desired to be formed in other ways, as by assembling pieces of piston ring material of one type on a supporting piston ring material of another type.

In Figs. 7–12 inclusive, I have illustrated a modification of the invention, in which a strip 8 of resilient piston ring material is cut to provide segments 9 and 10, connected together by web portions 11. Fig. 7 fragmentarily illustrates the strip with its ends in spaced-apart relation.

In forming the ends of the strip, the strip is cut out to form tabs 12 and 13, which are integral with the webs 14 and 15 at the ends of the strip. There are also formed relatively large segments 16 and relatively small segments 17. The strip thus formed is bent longitudinally of itself to provide a generally U-shaped annular body such as already described.

Thereafter the tabs 12 and 13 are bent along lines of folding which extend axially of the annular body, to fold the tabs into a substantially right angularly extending position with respect to the webs 11. The tabs then become interposed between the segments 17 and the segments 16, and are of a size such that they occur flush with the inner edges of these segments to form flat faces at the ends of the ring (Figs. 11 and 12).

The improved ends of this ring described are characterized by the same strength and rigidity present in the ring of Figs. 1–6 inclusive, and also provide flat abutting end surfaces by means of which the ring may be easily arranged and held in a compacted position in a cylinder.

I may also desire to resort to a modification such as that shown in Figs. 13–19 inclusive, in which a strip of piston ring material 19 is formed with segments 20 and web portions 18, also segments 21 and 22 at one end of the strip and segments 23 and 24 at the opposite end of the strip. A tab portion 25, formed in the manner described in connection with the ring illustrated in Figs. 7–12 inclusive, is provided at a point intermediate the segments 23 and 24 and integral with the web portion 26.

The ring is folded longitudinally of itself to provide a generally U-shaped annular body as illustrated in Fig. 14, and the segment 21 is bent along a radial line of folding into a position such as that shown in Fig. 15, to form a flat end face, as has been described in connection with Figs. 1–6 inclusive.

The tab portion 25 at the opposite end of the ring occurs in a position substantially opposite an opening 27 occurring between the segment 21 and the web 18, which permits the tab 25 to be inserted in the opening 27, thus affording a means of locking the two ends of the ring together in a proper abutting position (Figs. 16, 19).

It will be observed that the segment 21 provides a supporting means for imparting rigidity to the ring, and further stiffening action is obtained by the presence of the tab 25 located between the segment 21 and the web 18. At the same time, the tab 25 provides means for guiding the ends of the ring into a proper abutting position.

In Figs. 20–24 inclusive, I have illustrated a piston ring 30 in which is included a tongue member 31 which facilitates engagement of the ends of the ring 30 with one another. The tongue member 31 preferably is of a U-shaped section corresponding to the U-shaped cross section of ring 30. As illustrated in Figs. 20 and 21, the tongue member 30 is secured throughout a part of its length between upper segments 32 and lower segments 33 of the ring 30, by means of tabs 34 which extend axially between connecting portions 35 of the segments 32 and 33.

The tabs 34 are obtained by cutting the inner peripheral surface 36 of the tongue member 31 along spaced-apart axially extending lines and then cutting circumferentially extending lines which intersect the first mentioned lines, to provide partially severed portions. The cut ends are bent into a position such as that illustrated in Fig. 23, and the lengths of the tab portions 34 are preferably such that the tabs, while engaging between the webs 35, do not project axially above or below the rows of segments 32 and 33, as may be better observed from an inspection of Fig. 21.

The tongue member 31 extends circumferentially beyond the end of the ring 30 in which it is secured by the tabs, and in such position is adapted to be readily inserted between the upper and lower rows of segments of the ring at an opposite end thereof, as illustrated in Fig. 21. When inserting the tongue 31 in ring 30 the tabs 34 are left in the position shown in Fig. 24 and thereafter bent into an axially extending position in engagement with the webs.

It will be seen that the tongue portion also facilitates arranging the ends of the ring 30 in abutting relation and is especially advantageous in insuring that the spaced-apart rows of segments at one end will uniformly abut the spaced-apart rows of segments at the other end of the ring. Likewise the tongue element 31 affords a reinforcing action at the ends of the ring, tending to prevent distortion of segments and imparting added rigidity at these points.

It may also be desired to employ modified tongue members and to provide therewith various types of fastening means for holding the ends of a ring in a substantially connected position. Figs. 25-35 inclusive illustrate various forms of tongue members, some of which are adapted to facilitate abutment of the ends of a ring, and others of which are adapted to provide for connecting together the ends of a ring.

In Figs. 25 and 26 I have illustrated a ring 39 having segments 40 and 41, between which is engaged a spring member 42 made up of a strip of resilient metal folded upon itself and having ends 43 and 44 engaged with web portions 45. A part of the folded end of the strip 42 extends into and is supported between upper and lower segments of the ring at an opposite end thereof as is disclosed in Fig. 26. The strip 42 is of an axial height generally corresponding to the axial space between the upper and lower rows of segments 40 and 41 so that edges of the strip 42 present supporting surfaces with which the segments lie in contact. There is thus imparted added rigidity to the ring with respect to forces directed axially thereagainst.

Figs. 27 and 28 illustrate a ring 47 having a wire member 48 supported between the upper segments 49 and lower segments 50 by means of bent ends 51 and 52 which are engaged between web portions 53. The wire 48 is folded upon itself as may be more clearly seen in Fig. 28 to provide a tongue portion extending between the two ends of the ring 47. In addition to forming a tongue member, the wire 48 furnishes rigidity to the ring in an axial direction.

Fig. 29 illustrates a ring 55 which includes a channel member 37. Fig. 30 illustrates a ring having upper rows of segments 56 and lower rows of segments 57 between which extends a support member 58 reversely folded upon itself. Numeral 60 denotes a channel member mounted between the rows of segments and 59 denotes openings punched through the channel member to provide projecting edges which extend between the reversely folded portions of member 58. The features and advantages similar to those already described are present in the ring of Figs. 29 and 30.

Fig. 31 illustrates a ring 62 in which is engaged a connecting member 63 engaged around web portions 64 throughout a part of its length, and throughout the remainder of its length engaged around web portions 65 and 66, which occur at the two ends of the ring. The result of this arrangement is to provide a means for securing together the ends of the ring in an abutting position when such arrangement is desired to be resorted to.

Figs. 32 and 33 illustrate a ring 68 having a supporting element 69 which constitutes a resilient strip of metal bent upon itself. The supporting element 69 has its bent portion engaged between two adjacent webs 70, and has its outer ends lying between upper and lower segments of the ring to provide supporting means for the crowns when the segments are forced against one another. The particular arrangement noted may be reversed, as has been illustrated in Figs. 34 and 35 of the drawings.

Figs. 36-38 inclusive illustrate a method of reinforcing segments at the ends of a ring 72. 73 denotes weldings by which half segments 73 are secured to adjacent full segments 74, thereby to become reinforced.

Figs. 39 and 40 illustrate a ring 77 having upper rows of segments 78 and lower rows of segments 79. In this form of ring a web portion 80 at one end of the ring includes a tongue portion 81 integral therewith and extending circumferentially into engagement with the opposite end of the ring, thus affording means for facilitating the arrangement of the ends of the ring in abutting relation, and also supporting the segments at the ends of the ring.

In addition to this, the segments 82 and 83 are respectively formed with an opening 84 and a tab portion 85, which are adapted to engage the segments with one another. By this arrangement the ends of the ring may be prevented from being moved relative to one another in a radial direction. There are thus combined in one piston ring structure tongue means for arranging them together, support means constituted by the tongue means for preventing axial displacement of the ends of the ring in an axial direction with respect to one another, and tab means for preventing radial displacement of the ends of the ring with respect to one another.

Having described my invention, I claim:

1. A split piston ring comprising upper and lower layers of piston ring material connected together in axially spaced-apart relation, said layers being separated by cuts which define circumferentially spaced-apart segments, the extremities of the ring including relatively large segments and relatively small segments, each of said relatively large segments being bent at right angles and lying in contact with a relatively small segment, thereby to form flat abutting faces at the extremities of the ring.

2. A piston ring comprising a strip of resilient sheet material formed into an annular body, said sheet material folded longitudinally of the strip to provide circumferential land surfaces and connecting web portions, said annular body having openings extending between the said circumferential surfaces and web portions to define spaced-apart segments in the land surfaces, the extremities of said strip having tab portions formed therealong, said tab portions being axially disposed at the ends of the annular body to provide flat abutting surfaces.

3. A split piston ring comprising upper and lower layers of piston ring material connected together in axially spaced-apart relation, said layers being separated by cuts which define circumferentially spaced-apart segments, the segments at the extremities of the ring being formed with tab portions, said tab portions being bent along axial lines of folding.

4. A piston ring comprising upper and lower layers of piston ring material connected together in axially spaced-apart relation, said layers being separated by cuts which define circumferentially spaced-apart segments and webs, said webs at the extremities of the ring including projecting ends, said projecting ends bent along axial lines of bending and lying in contact with segments of the said upper and lower layers of piston ring material in a position such that the edges of the segments occur in the plane of the bent projecting ends.

5. A split piston ring comprising upper and lower layers of resilient piston ring material connected together in axially spaced-apart relation, said layers being separated by radial cuts which define circumferentially spaced-apart segments and webs, a segment at one extremity of the ring being formed with a tab portion, said tab portion being bent at right angles along a radial line of folding and lying in contact with a segment at an opposite side of the ring, the extremity of the ring which includes said tab portion having an opening located between the tab portion and an adjacent web, the opposite extremity of the ring having a web thereof formed with a tongue member, said tongue member adapted to engage in the opening between the tab and adjacent web at the opposite extremity of the ring for the purpose of maintaining the extremities in abutting relation.

6. A split piston ring comprising upper and lower layers of piston ring material connected together in axially spaced-apart relation, said layers being separated by cuts which define circumferentially spaced-apart segments and webs, a tab member axially disposed at one extremity of the ring in spaced relation to a web, a tongue member located at the other extremity of the ring adapted to engage between the tab and web at the opposite extremity.

THOMAS A. BOWERS.